Figure 1:
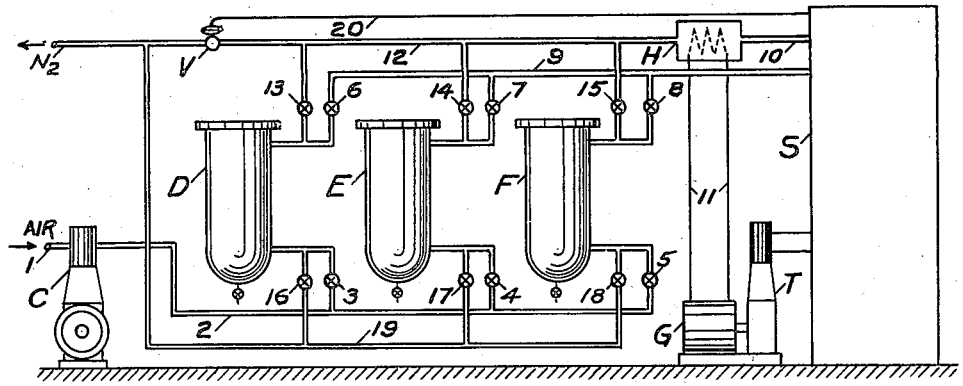

Sept. 21, 1937.   W. L. DE BAUFRE   2,093,805

METHOD OF AND APPARATUS FOR DRYING A MOIST GASEOUS MIXTURE

Filed March 13, 1935

INVENTOR
Wm. L. de Baufre

Patented Sept. 21, 1937

2,093,805

UNITED STATES PATENT OFFICE 2,093,805

METHOD OF AND APPARATUS FOR DRYING A MOIST GASEOUS MIXTURE

William Lane De Baufre, Lincoln, Nebr.

Application March 13, 1935, Serial No. 10,955

20 Claims. (Cl. 62—175.5)

This invention relates to the art of separating gaseous mixtures where the gaseous mixture must be dried before being rectified into its components. It is particularly applicable to drying atmospheric air which is separated into more or less pure oxygen and nitrogen.

Rectification of atmospheric air must occur at temperatures considerably below atmospheric temperature. In cooling the air to a suitable temperature for introduction into the rectifier, the moisture originally in the atmospheric air is condensed within the separation unit to liquid water above zero centigrade or is deposited as frost upon the cooling surfaces below zero centigrade. After a period of operation, the part of the separation unit in which frost accumulates, must be defrosted by being warmed to a temperature above zero centigrade. For continuous operation of the separation unit, this means that parts of the apparatus where frost accumulates must be provided in duplicate so that one part may be available for use while the other part is being defrosted. Such deposition of frost, however, may be prevented by drying the gaseous mixture before cooling it below zero centigrade.

This invention pertains to drying a gaseous mixture by means of a hygroscopic material which takes up moisture from a gas flowing through it until equilibrium is reached between the tendency of the material to give up moisture and its tendency to take up moisture. Such a material as silica gel, for example, can be revivified by passing through it a gas which is drier than the moist gaseous mixture to be dried. When atmospheric air is rectified at a temperature approaching two hundred degrees below zero centigrade, the returning products of rectification contain almost no moisture.

This invention proposes to utilize the returning nitrogen product of rectification to revivify the hygroscopic material through which the moist air is passed to dry the same. The returning nitrogen, however, is but slightly above atmospheric pressure, while the air to be dried is compressed to a pressure of 200 to 400 or 500 lb. gage. Also it would be undesirable to impose a large back pressure or a variable back pressure upon the separation unit. Finally, the temperature of the returning nitrogen is lower than that of the air to be dried.

The object of the method and apparatus described and claimed herein is to dry compressed moist atmospheric air by use of hygroscopic material and to revivify the material after it has absorbed moisture by means of the returning nitrogen component of rectification of the dried air. Subsidiary objects are to accomplish this automatically with little back pressure on the separation unit and with a constant back pressure in order that rectification of the air will not be adversely affected by the operation of the drying apparatus. It is also proposed to utilize the external work of the expansion engine for supplying refrigeration to the separation unit, for the purpose of heating the returning nitrogen and thereby increasing its revivifying effect.

Figure 2:
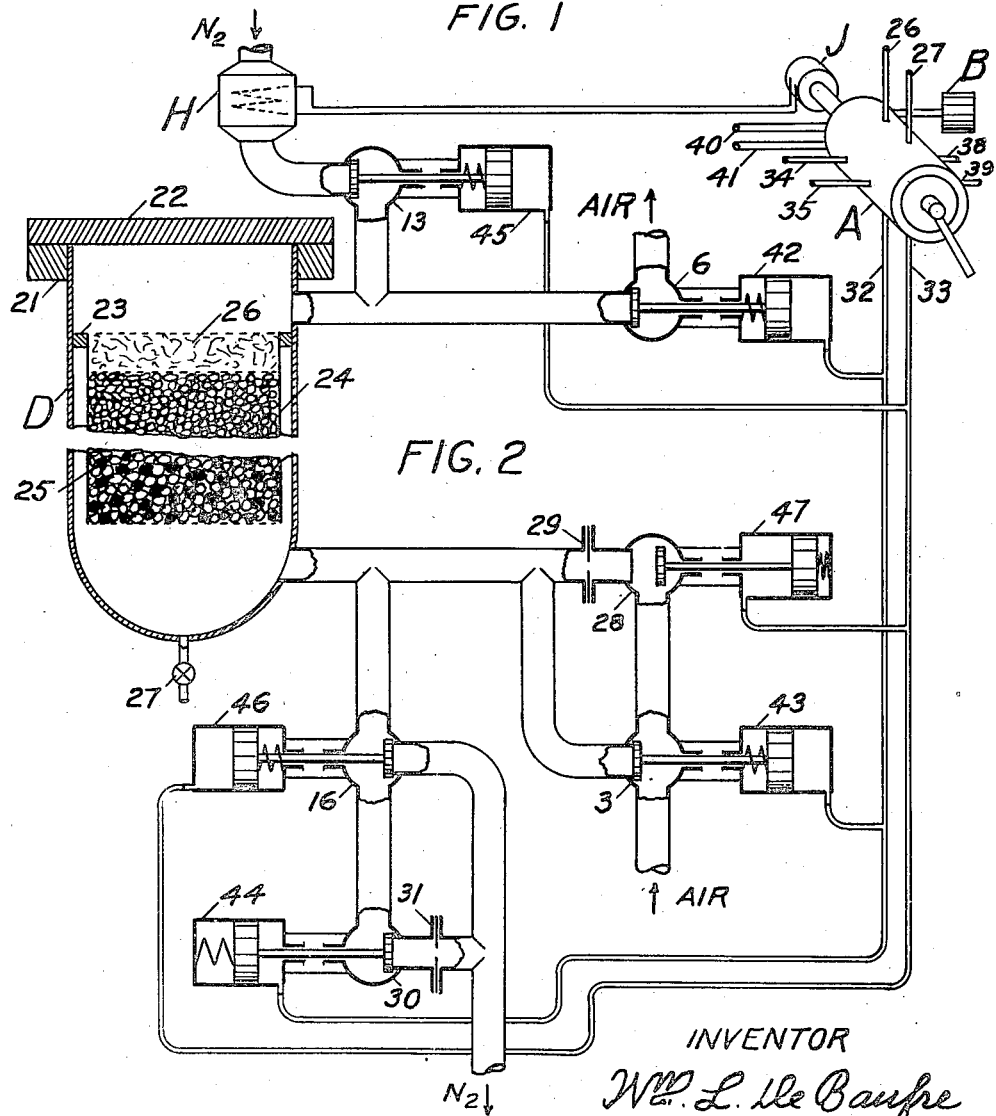

The foregoing, together with such other objects and advantages as may hereinafter appear or are incident to the invention, are accomplished by means of an arrangement which is illustrated in preferred form in the accompanying drawing, wherein Fig. 1 shows the drying apparatus in relation to the air compressor, separation unit and expansion engine of the whole air separation system, while Fig. 2 shows in detail the arrangement of the valves and control mechanism for regulating the flow of compressed air and of returning nitrogen through one vessel containing the hygroscopic material.

Referring to Fig. 1, the atmospheric air to be separated into more or less pure oxygen and nitrogen enters compressor C through pipe 1 after having carbon dioxide removed in an absorption tower not shown. It may be pointed out, however, that the drying apparatus to be described can also be used for removing carbon dioxide by using a material which has selective absorbtivity for carbon dioxide, such as activated carbon. Also, certain features of the invention apply to recuperators where the air is cooled as well as purified of water vapor and carbon dioxide. While moisture and carbon dioxide are in this case simply deposited upon the surface of the filling material within the recuperator rather than being absorbed thereby, the problem of controlling the flow of compressed air and of returning oxygen or nitrogen therethrough is essentially the same as when the compressed air is purified without being cooled.

While certain of the claims are specifically worded to cover the removal of an impurity from the gaseous mixture, it is to be understood that any impurity and suitable absorption material may be substituted for moisture and hygroscopic material in the remaining claims. Also, the claims cover analogous uses in recuperators where the gaseous mixture is cooled as well as purified, adsorption by cooling material taking the place of absorption by hygroscopic material. To simplify the description, however, it will be assumed that carbon dioxide has been removed from the compressed air by other means, and that the apparatus to be described is applied for removal of water vapor only.

Compressor C is of the multistage type with intercoolers and an aftercooler, and it will be assumed that the water resulting from condensation of moisture due to reducing the volume of the air by compression, has been drained from these intercoolers and aftercooler. The compressed air containing saturated water vapor at the temperature leaving the aftercooler then flows from compressor C through pipe 2.

Three vessels of the drying apparatus are shown at D, E, and F. Three is the minimum number of such vessels that can be used as will become evident in describing their operation. It is preferred, however, to use four or five or more such vessels for reasons which will also become apparent later. The compressed air enters one of these vessels through one of valves 3, 4 or 5, and leaves through the corresponding valve 6, 7 or 8, thence flowing through pipe 9 to separation unit S. Expansion engine, or turbine, T furnishes the low temperature refrigeration necessary for cooling and operating separation unit S. The external work of this expansion engine, or turbine, is utilized to drive electric generator G.

Within separation unit S are the necessary interchangers and rectifier for cooling the dried compressed air to a very low temperature and separating the dried air into more or less pure oxygen and nitrogen which are then warmed nearly to the temperature of the entering compressed air by heat exchange therewith. The returning dry nitrogen flows through pipe 10 to heater H where the returning nitrogen is warmed by electrical energy from generator G transmitted by conductors 11 to the heating coils shown dotted within heater H.

The warmed dry nitrogen then returns through pipe 12. Part of the returning dry nitrogen flows through one or two of valves 13, 14 and 15 and then through the corresponding valves 16, 17 and 18 to pipe 19. The remainder of the returning dry nitrogen flows through pressure relief valve V, which is set either to maintain a nearly constant pressure just ahead of the valve or to maintain a nearly constant rectification pressure by means of control tube 20.

Assume that valves 3, 6, 14, 15, 17 and 18 are open and that valves 4, 5, 7, 8, 13 and 16 are closed. Then the moist compressed air flows up through the hygroscopic material within vessel D and the warm dry returning nitrogen flows down through the hygroscopic material within vessels E and F. After a period of operation in this manner, it is desirable to interchange one of vessels E or F in which the hygroscopic material has been revivified by the returning nitrogen, with vessel D in which the hygroscopic material has absorbed moisture from the compressed air.

To interchange vessel E with vessel D, the procedure should be as follows: Close valves 14 and 17 so as to shut off flow of nitrogen through vessel E. Open valve 4 a slight amount in order to throttle compressed air slowly into vessel E. When the compressed air pressure within vessel E is nearly equal to the pressure within pipe 2, valves 4 and 7 may be opened wide. Then close valves 3 and 6 so as to shut off the flow of compressed air through vessel D. Open valve 16 a slight amount in order to throttle the compressed air entrapped within vessel D slowly out of vessel D. When the air pressure within vessel D is reduced nearly to the pressure in pipe 19, valves 13 and 16 may be opened wide. Vessels D and E have then been interchanged. Equalization of pressure in both cases may be determined by means of pressure gages or by the sound of the compressed air being throttled through valves 4 and 16.

By periodically interchanging vessels D, E and F in rotation, the flow of compressed air may be shifted to revivified material before the effectiveness of removal of water vapor from the compressed air is much reduced.

The nitrogen returning from the separation unit may amount to only 80 per cent or less of the mass of atmospheric air rectified. Its volume will be a number of times greater than that of the compressed air, however, by reason of its low pressure. Also, a given pressure drop of the compressed air in flowing through the drying apparatus simply means a slightly higher compression pressure for the compressor to work against. The pressure drop of the returning nitrogen in flowing through the drying apparatus, however, raises the rectification pressure and thereby decreases the effectiveness of separation due to less spread between equilibrium compositions of liquid and vapor mixtures of oxygen and nitrogen at higher pressure. For these reasons, the drying units are provided in multiple so that nitrogen may return through two or preferably more units in parallel while the compressed air is flowing through a single unit. The mass velocity of the returning nitrogen flowing through each vessel of the drying apparatus is thus substantially lower than the mass velocity of the compressed air flowing therethrough. A low mass velocity of the returning nitrogen flowing through the material which has taken up moisture from the compressed air, provides the time element necessary for vaporization of the moisture and its absorption by the returning nitrogen.

With three or more vessels containing hygroscopic material comprising the drying apparatus and the moist compressed air flowing through one vessel only while nitrogen flows through the remaining vessels, it is evident that in interchanging at intervals the one vessel with one of the remaining vessels, the nitrogen flows through each vessel for a longer period of time to remove absorbed moisture from the hygroscopic material therein than the moist compressed air flows through the same vessel in depositing moisture therein. The longer time interval is desirable in increasing the effectiveness of the nitrogen in taking up moisture from the hygroscopic material.

The heating of the returning nitrogen before flowing through the material to be revivified, increases the effectiveness of the nitrogen in drying the material, partly by increasing the volume of the nitrogen and by increasing the density of the saturated water vapor which each cubic foot of nitrogen can hold, and also by supplying the heat energy necessary for freeing the moisture from the material to be revivified and vaporizing the moisture.

The automatic pressure relief valve maintains a constant rectification pressure in spite of variations in pressure drop through the material to be revivified.

Referring to Fig. 2, each vessel of the drying apparatus, as shown at D, consists of a cylindrical tube drawn together to form the lower end of the vessel and with a flange 21 and cover 22 to close the upper end. Supported on a ring 23 within vessel D is a cylindrical tube 24 containing hygroscopic material 25 in the form of small lumps for taking moisture from or giving moisture to a gas flowing through cylinder 24. At the top of cylinder 24 is a layer of filtering material 26 to prevent dust from hygroscopic material 25 being carried out of vessel D and into the interchangers and rectifier of the separation unit. The joint between ring 23 and cylinder 24 is practically gas tight. A drain 27 is provided to remove excess moisture and sludge from vessel D.

In absorbing large amounts of moisture from compressed air flowing up through hygroscopic material 25, there is danger of the hygroscopic material fusing together and thus clogging the drying apparatus, particularly at the time of shifting over to the returning nitrogen which has low mass velocity and a correspondingly low pressure drop through the material to be dried. To prevent such fusing, it is proposed to mix with the hygroscopic material a less hygroscopic material which will absorb less moisture and thus have less tendency to fuse together. The black particles shown in hygroscopic material 25 in Fig. 2 represents this less hygroscopic material.

Valves 3, 6, 13 and 16 in Fig. 2 correspond to the valves with the same numbers in Fig. 1. A by-pass valve 28 with orifice 29 is provided for valve 3, so that instead of opening valve 3 a small amount to throttle compressed air into vessel D, valve 28 is opened wide and the throttling is accomplished by orifice 29. Similarly, valve 30 and orifice 31 are provided to throttle the entrapped compressed air out of vessel D instead of opening valve 16 a small amount. Valves 3 and 16 are either opened wide or closed tight instead of being subjected to cutting and leakage by wire drawing high pressure gases therethrough as would be necessary without the by-pass valves and orifices. The rates of rise and fall of gas pressure within vessel D are determined by the sizes of orifices 29 and 31, so that this feature of operation is thus removed from the vagaries of the operators.

Valves 3, 6, 13, 16, 28 and 30 are each operated as shown in Fig. 2 by fluid pressure upon a piston within a cylinder attached to the valve body. The operating fluid is supplied and discharged through tubes 32 and 33 connected to central control mechanism A, the rotation of which insures these valves being operated in proper sequence.

Control mechanism A is connected by tubes 34, 35, 36, 37, 38 and 39 to valves of three additional vessels similar to D. Any desired number of vessels can be so connected by tubes to control mechanism A. Its steady rotation by electric motor B will then operate all valves for all vessels in proper sequence.

In Fig. 2, a separate heating unit H is shown for the returning nitrogen to vessel D. It is proposed to supply such a separate heating unit for each vessel of the drying apparatus and to control the time of heating by means of commutator J mounted on the same shaft as control mechanism A. It is further proposed to so arrange this commutator that the electric current will flow through the heating coil within heater H only while the returning nitrogen is flowing therethrough, and that the electric current will be shut off a sufficient time before the flow of nitrogen ceases in order to permit hygroscopic material 25 to be cooled by unheated nitrogen nearly to the cool nitrogen temperature. By this means, the compressed air will not be appreciably heated in flowing through material 25 on its way to the separtion unit. Brushes for conductors connecting to similar heaters for other vessels of the drying apparatus may be mounted at equal spaces around commutator J.

Assume that hygroscopic material 25 in vessel D of Fig. 2 has been revivified by warm dry nitrogen flowing downwards through it and that the electric current through heater H has been turned off a sufficient length of time to permit material 25 to be cooled down nearly to the cool nitrogen temperature. During this interval, tube 32 was connected to fluid pressure pipe 40 while tube 33 was connected to fluid exhaust pipe 41 through control mechanism A. To shut off flow of nitrogen through vessel D and gradually raise the gas pressure therein to the compressed air pressure and then start flow of compressed air through D, it is only necessary for control mechanism A to reverse the connection of tubes 32 and 33 to pipes 40 and 41.

Thus, when tube 32 is changed from connection with pressure pipe 40 to connection with exhaust pipe 41, the fluid pressure is relieved within cylinders 42, 43 and 44. Nothing happens to valves 3 and 6 because these valve are held closed by the high compressed air pressure upon them against the low nitrogen pressure within vessel D. Valve 30, however, which had been held open by high fluid pressure in cylinder 44, is closed by the spring on the opposite side of the piston. A moderate spring pressure only is necessary since the pressures on the two sides of valve 30 are almost equal.

When, at the same time, tube 33 is changed from connection with exhaust pipe 41 to connection with pressure pipe 40 by control mechanism A, fluid pressure is applied within cylinders 45, 46 and 47. Valves 13 and 16 are immediately closed, thus shutting off the flow of returning nitrogen through vessel D. Valve 28 is at the same time opened wide as shown by the fluid pressure. Compressed air then flows through orifice 29 into vessel D. By proper selection of the size of orifice 29, any desired rate of pressure rise can be obtained in vessel D. The rate of flow will remain practically constant until the pressure within vessel D exceeds the critical pressure of about one-half the absolute pressure of the compressed air. The rate of flow will then gradually decrease. Finally, when the initial compressed air pressure is nearly reached within vessel D, valve 3 will open wide with assistance of the spring in cylinder 43. Valve 6 will also open wide by the pressure under it with the assistance of the spring in cylinder 42. The compressed air will then continue to flow up through the hygroscopic material within vessel D until tubes 32 and 33 are reversed in connection to fluid supply and exhaust pipes 40 and 41 by control mechanism A.

When this reversal takes place and tube 32 is again connected with fluid pressure pipe 40 and tube 33 is again connected with fluid exhaust pipe 41, valve 28 will be closed by spring pressure, valves 3 and 6 will be closed by fluid pressure and valve 30 will be opened by fluid pressure, while valves 13 and 16 will remain closed. That is, flow of compressed air through vessel D will be shut off and the compressed air entrapped within vessel D will be gradually released and the pressure therein reduced by flow of the entrapped air through orifice 31. The rate of flow will be nearly constant until the pressure is reduced to about double the returning nitrogen pressure, after which the rate of flow will gradually decrease. Finally, when the pressure in vessel D nearly reaches that of the returning nitrogen, valve 16 will be opened by spring pressure and valve 13 will be opened by the pressure under it assisted by spring pressure.

The springs within cylinders 42, 43, 44, 45, 46 and 47 are all comparatively light as they are intended to operate only when the pressures on the two sides of valves 3, 6, 13, 28 and 30 are nearly equal. Electrically-operated instead of fluid-operated valves may be employed with a control mechanism at A suitable for turning on and off the operating electric current to the several valves in proper sequence.

I claim:

1. A method of drying a moist gaseous mixture and of separating the dried gaseous mixture into gaseous components which includes passing said moist gaseous mixture through a mass of material for a period of time to take up moisture from said gaseous mixture, passing one gaseous component through two or more masses of similar material to remove moisture therefrom, interchanging the mass of material through which said moist gaseous mixture flows with one of the masses through which said gaseous component flows, repeating the last mentioned step until each mass has been subjected in rotation to said moist gaseous mixture, and then repeating the series of steps, whereby each mass of material is subjected for a longer period of time to said gaseous component than to said moist gaseous mixture and the mass velocity of said gaseous component through said material is less than one-half the mass velocity of said moist gaseous mixture through said material.

2. A method of drying a moist gaseous mixture and of separating the dried gaseous mixture into gaseous components which includes passing said moist gaseous mixture through a mass of material for a period of time to take up moisture from said gaseous mixture, passing one gaseous component through two or more masses of similar material to remove moisture therefrom, discontinuing the flow of the gaseous component through one of said masses, passing a portion of said moist gaseous mixture through said one of said masses, subsequently discontinuing the flow of said moist gaseous mixture through the first mentioned mass of material and then passing the gaseous component therethrough, whereby each mass of said material is subjected for a longer period of time to said gaseous component at a substantially lowered mass velocity than to said moist gaseous mixture without completely interrupting the flows of either the said gaseous component or the said moist gaseous mixture.

3. A method of drying a moist gaseous mixture and of separating the dried gaseous mixture into gaseous components, which includes compressing the moist gaseous mixture, passing the compressed moist gaseous mixture through material to take up moisture from said gaseous mixture, rectifying the dried gaseous mixture at reduced pressure into dry gaseous components, passing one of said dry gaseous components at reduced pressure through other material to remove moisture therefrom, stopping the flow of dry gaseous component through a portion of said other material from which moisture has been removed, gradually raising the gas pressure thereon and then passing compressed moist gaseous mixture therethrough, stopping the flow of compressed moist gaseous mixture through the material which has taken up moisture, gradually lowering the gas pressure thereon and then passing the said dry gaseous component at reduced pressure therethrough to remove moisture therefrom.

4. An apparatus for drying a moist gaseous mixture and for separating the dried gaseous mixture into gaseous components, including multiple vessels containing material for taking up moisture, means for passing said moist gaseous mixture through one of said vessels whereby said material takes up moisture from said gaseous mixture, means for passing one of said gaseous components through two or more remaining vessels in parallel whereby moisture is removed from said material, and means for interchanging the one of said vessels with one of the remaining vessels.

5. An apparatus for drying a moist gaseous mixture and for separating the dried gaseous mixture into gaseous components as in claim 4, including means for gradually raising the pressure in one of the remaining vessels before interchanging it with the one of said vessels.

6. An apparatus for drying a moist gaseous mixture and for separating the dried gaseous mixture into gaseous components as in claim 4, including means for gradually lowering the pressure in the one of said vessels before interchanging it with one of the remaining vessels.

7. An apparatus for drying a compressed moist gaseous mixture and for separating the dried gaseous mixture into gaseous components at low pressure, including a vessel containing material for taking up moisture, a valve for admitting the compressed moist gaseous mixture thereto, a valve for discharging the dried gaseous mixture therefrom, a valve for admitting one of the gaseous components thereto, a valve for discharging said gaseous component therefrom, a by-pass valve with orifice for gradually admitting the compressed moist gaseous mixture thereto, a by-pass valve with orifice for gradually discharging compressed gaseous mixture therefrom, means for simultaneously closing the valves for admitting and discharging said gaseous component and opening the by-pass valve with orifice for gradually admitting compressed gaseous mixture thereto, means for automatically opening the valves for admitting and discharging the gaseous mixture when the pressure within said vessel nearly reaches the pressure of the compressed moist gaseous mixture, means for simultaneously closing the valves for admitting and discharging the gaseous mixture and opening the by-pass with orifice for gradually discharging the compressed gaseous mixture therefrom, and means for automatically opening the valves for admitting and discharging said gaseous component when the pressure within said vessel nearly reaches the low pressure of said gaseous component.

8. An apparatus for drying a compressed moist gaseous mixture and for separating the dried gaseous mixture into gaseous components at low pressure as in claim 7, including a control mechanism for operating said valves in sequence.

9. An apparatus for drying a moist gaseous mixture and for separating the dried gaseous mixture into gaseous components, including a vessel containing hygroscopic material for absorbing moisture from said moist gaseous mixture, a separation unit for cooling and rectifying the dried gaseous mixture, an expansion engine for expanding a portion of the dried gaseous mixture with performance of external work, means for applying said external work to heat one of the gaseous components from said separation unit, and means for passing the warm dry gaseous component through said vessel to remove absorbed moisture from said hygroscopic material.

10. An apparatus for drying a moist mixture and for separating the dried gaseous mixture into gaseous components, including vessels containing material for taking up moisture, a rectifier, a pressure relief valve, and means for passing one of said gaseous components from said rectifier through said vessels and said pressure relief valve in parallel whereby a substantially constant pressure is maintained within said rectifier.

11. An apparatus for drying a moist gaseous mixture and for separating the dried gaseous mixture into gaseous components, including vessels containing hygroscopic material, means for passing one of said gaseous components through said vessels in parallel whereby absorbed moisture is removed from said hygroscopic material, means for warming said gaseous component before passing it through each of said vessels, means for shutting off the warming of said gaseous component passing through one of said vessels, means for subsequently shutting off the flow of cool gaseous component through said vessel, and means for passing said moist gaseous mixture through said vessel whereby said moist gaseous mixture is dried without being appreciably warmed.

12. A method of drying a moist gaseous mixture and of separating the dried gaseous mixture into gaseous components which includes passing one of said gaseous components through hygroscopic material to remove absorbed moisture therefrom, warming said gaseous component to increase the effectiveness of moisture removal, ceasing the warming to permit cool gaseous component to cool said hygroscopic material, shutting off the flow of cool gaseous component through said vessel, and then passing said moist gaseous mixture through the cooled hygroscopic material whereby the moist gaseous mixture is dried without being appreciably warmed.

13. Apparatus for drying a compressed gas, including a vessel containing material for taking up moisture from said gas, an orifice for admitting said compressed gas slowly into said vessel, a valve for shutting off flow of gas through said orifice, said valve being held closed by the pressure of said compressed gas upon said valve, manually operable means for opening said valve against said pressure, and automatic means for closing said valve when said opening means is released.

14. Apparatus for drying a compressed gas as in claim 13, including a valve for admitting said compressed gas into said vessel in parallel with said orifice, said valve being held closed by the pressure of said compressed gas tending to flow into said vessel, automatic means for opening said valve when the pressure within said vessel is raised nearly to the pressure of said compressed gas whereby flow of said compressed gas into said vessel is not restricted by said orifice, and means for closing said valve against said automatic means.

15. Apparatus for drying a compressed gas as in claim 13, including a valve for discharging compressed gas from said vessel, said valve being held closed by the pressure of compressed gas beyond said valve tending to return into said vessel, automatic means for opening said valve when the pressure within said vessel is raised nearly to the pressure of the compressed gas beyond said valve, and means for closing said valve against said automatic means.

16. Apparatus for drying a compressed gas as in claim 13, including a valve for admitting said compressed gas into said vessel in parallel with said orifice, another valve for discharging compressed gas from said vessel, both valves being held closed by the pressure of compressed gas tending to flow into said vessel, automatic means for opening each valve when the pressure within said vessel is raised nearly to the pressure on the other side of each valve, means for closing each valve against said automatic means, and means for simultaneously operating said closing means and releasing the opening means of the valve for shutting off flow of gas through said orifice.

17. Apparatus for drying a compressed gas, including a vessel containing material for taking up moisture from said gas, an orifice for discharging compressed gas slowly from said vessel, a valve for shutting off flow of gas through said orifice, said valve being held closed by the pressure of compressed gas within said vessel, means for opening said valve against said pressure, and automatic means for closing said valve when said opening means is released.

18. Apparatus for drying a compressed gas as in claim 17, including a valve for discharging gas from said vessel in parallel with said orifice, said valve being held closed by the pressure of compressed gas within said vessel, automatic means for opening said valve when the pressure within said vessel is reduced nearly to the pressure beyond said valve whereby discharge of gas from said vessel is not restricted by said orifice, and means for closing said valve against said automatic means.

19. Apparatus for drying a compressed gas as in claim 17, including a valve for admitting gas into said vessel, said valve being held closed by the pressure of compressed gas within said vessel, automatic means for opening said valve when the pressure within said vessel is reduced nearly to the pressure on the other side of said valve, and means for closing said valve against said automatic means.

20. Apparatus for drying a compressed gas as in claim 17, including a valve for discharging gas from said vessel in parallel with said orifice, another valve for admitting gas into said vessel, both valves being held closed by the pressure of compressed gas within said vessel, automatic means for opening each valve when the pressure within said vessel is reduced nearly to the pressure on the other side of each valve, means for closing each valve against said automatic means, and means for simultaneously operating said closing means and releasing the opening means of the valve for shutting off flow of gas through said orifice.

WILLIAM LANE DE BAUFRE.